United States Patent [19]

Schott et al.

[11] Patent Number: 4,690,775

[45] Date of Patent: Sep. 1, 1987

[54] EMULSION-BASED GEL AND PROCESS FOR PREPARING SAME

[75] Inventors: Hans Schott; Alan E. Royce, both of Philadelphia, Pa.

[73] Assignee: Research Corporation, New York, N.Y.

[21] Appl. No.: 726,923

[22] Filed: Apr. 25, 1985

Related U.S. Application Data

[63] Continuation of Ser. No. 537,980, Sep. 30, 1983, abandoned.

[51] Int. Cl.$^4$ ............................................. B01J 13/00
[52] U.S. Cl. ................................. 252/312; 252/315.1
[58] Field of Search ................. 252/312, 315.1, 316, 252/349; 156/DIG. 108

[56] References Cited

U.S. PATENT DOCUMENTS

| 3,101,301 | 8/1963 | Siegal et al. | 252/315.1 |
| 4,066,568 | 1/1978 | Nakazawa et al. | 252/316 |
| 4,160,754 | 7/1979 | Schapel et al. | 424/82 |

OTHER PUBLICATIONS

Rehfeld, Journal of Colloid & Interface Science, 46, No. 3, pp. 448–458 (Mar. 1974).
Vold, et al., Journal of Colloid & Interface Science, vol. 65, No. 2, pp. 390–393 (Jun. 15, 1978).
Garrett, J. Soc. Cosmet. Chem., vol. 21 (May 27, 1970) pp. 393–415.

Primary Examiner—Amelia B. Yarbrough
Attorney, Agent, or Firm—Scully, Scott, Murphy & Presser

[57] ABSTRACT

Stable, isotropic gels which can be readily redispersed/reconstiuted into fluid emulsions, as such providing useful carriers for a wide variety of substances having little or no solubility in water, e.g., some types of drugs, are prepared by centrifuging an emulsion comprising a substantially oleophilic, hydrophobic liquid component constituting the dispersed phase in a substantially aqueous liquid component containing an emulsifying amount of emulsifying amount of emulsifying agent which is soluble therein at its level of concentration but which is substantially insoluble in the oleophilic, hydrophobic component, the emulsion being devoid of gelling agent, to separate the emulsion into a gel phase containing substantially all of the oleophilic, hydrophobic component of the emulsion and a clear aqueous phase.

32 Claims, No Drawings

EMULSION-BASED GEL AND PROCESS FOR PREPARING SAME

This application is a continuation, of application Ser. No. 537,980, filed Sept. 30, 1983, now abandoned.

BACKGROUND OF THE INVENTION

This invention, which is based on research supported by the U.S. Public Health Service, National Institutes of Health, relates to the field of gels and, in particular, to gels prepared from emulsions containing an oleophilic, hydrophobic dispersed phase and an aqueous continuous phase. These gels, when treated with aqueous media, spontaneously regenerate oil-in-water emulsions similar to the ones from which they were prepared. The invention also relates to processes for preparing gel compositions from emulsions and reconstituting emulsions from the gels by addition of water to the latter.

Emulsions, because of their instability, have relatively limited application as dosage forms. This is so despite the fact that the bioavailability of slightly soluble oral drugs, which are often absorbed incompletely in the gastro-intestinal tract because of their low solubility, is known to be considerably enhanced by dissolving such drugs in vegetable oils and emulsifying these oily solutions in water. Drug absorption from such emulsions is much faster and more complete than when these drugs are incorporated into tablets or capsules.

The reason that emulsions are not used more widely as vehicles for oral drugs is that their shelf-life is relatively brief, i.e., the oil droplets cream and coalesce on standing.

U.S. Pat. No. 4,066,568 describes the manufacture of microcapsules by dispersing and emulsifying hydrophobic materials containing medicines or color-forming materials which are insoluble in water, with the aid of gelatin and a coarcervating agent to make a coating film around the hydrophobic core. The production of gels which are stable on storage is described in U.S. Pat. No. 4,160,754, although by a different method comprising the use of a polymer matrix, a liquid dispersing agent and optional fibers. This patent discloses the use of gels for various purposes including perfume carriers, paddings and shock-absorbers.

Both Rehfeld, *Journal of Colloid and Interface Science*, 46, No. 3, 448–458 (March 1974) and Vold, et al., ibid., 65, No. 2, 390–393 (June 15, 1978) describe the ultracentrifugation of oil-in-water emulsions but are silent with respect to the presence of a gel fraction. Garrett, *J. Soc. Cosmet. Chem.*, 21, 393–415 (May 27, 1970) describes the use of ultracentrifugation in evaluating the stability and properties of oil-in-water emulsions. While brief mention is made of the appearance, following ultracentrifugation, of a "translucent cream" along with an opaque cream layer, there is no indication in this publication of the presence of a gel layer, possibly due to the fact that the boundary between any gel which may have formed and coalesced oil is very faint and only evident to the touch and upon standing, such gel as may have formed may have reverted to cream layers thereby escaping observation.

SUMMARY OF THE INVENTION

It has now been discovered that stable gels can be formed by centrifugation of oil-in-water emulsions comprising only an oil, water and a surfactant or mixture of surfactants. No gelling agent, such as commonly used soluble polymers, is necessary to provide the gels of this invention.

In accordance with the present invention, an isotropic gel is provided which comprises discrete, uncoalesced droplets of a substantially oleophilic, hydrophobic liquid component constituting the dispersed, or internal, phase in a substantially aqueous continuous, or external, phase, said aqueous phase containing an emulsifying amount of emulsifying agent which is soluble therein at its level of concentration but which is substantially insoluble in the oleophilic, hydrophobic component, said gel being devoid of gelling agent.

In general, the gels of this invention contain a high concentration of disperse phase, typically on the order of 80 percent by weight or more. Thus, when the emulsions from which the gels are prepared are reconstituted, an operation which only requires addition of water to the gels, a dosage form will be provided which can contain a fairly high level of active material.

The aforedescribed gel is prepared by centrifuging an emulsion comprising a substantially oleophilic, hydrophobic liquid component constituting the dispersed phase in an aqueous component constituting the continuous phase, said aqueous component containing an emulsifying amount of emulsifying agent which is soluble therein at its level of concentration but which is substantially insoluble in the oleophilic, hydrophobic component, the emulsion being devoid of gelling agent, to separate the emulsion (viewed from top to bottom as removed from the centrifuge) into a gel phase containing a portion of the oleophilic, hydrophobic component in the form of discrete uncoalesced droplets, a creamed emulsion phase containing portions of both the oleophilic, hydrophobic component and the aqueous phase and finally, a clear aqueous phase.

The gels of the present invention provide excellent vehicles for the storage, and when redispersed to provide fluid emulsions, for the administration of bioeffective substances such as drugs, medicaments, and the like, and possess significantly better physical stability than the emulsions from which they are prepared. The gels are also useful as concentrates for cosmetic and agricultural pesticide emulsions as well as other applications calling for the use of emulsions.

The gels of this invention are readily redispersed/reconstituted into fluid emulsions at the time of administration/application merely by the addition of water thereto, thereby providing effective dosage forms for substances having relatively low aqueous solubility. The water may contain one or more water soluble inorganic and/or organic substances, e.g., salts, acids, bases, sugars, buffering agents, polar solvents, etc., up to the limit of solubility therein. In fact, the presence of electrolyte in the water used to redisperse the gel tends to accelerate the reconstitution of the emulsion, possibly by increasing the osmotic pressure of the water, causing it to penetrate the gel faster because the aqueous phase of the gel contains no electrolyte. It is to be noted, however, that some electrolytes might destabilize the reconstituted emulsion, especially if the emulsifying agent used in the preparation of the emulsion is of the ionic variety.

DESCRIPTION OF THE PREFERRED EMBODIMENTS

The substantially oleophilic, hydrophobic liquid component of the gel and precursor emulsion can be selected from a wide variety of substances including edible fats and oils, liquid paraffins, aromatic and aliphatic hydrocarbons, essential oils and generally any liquid organic material having at most low or slight solubility in water and/or other polar solvent. The aqueous phase consists primarily of water with one or more water-soluble emulsifying agents dissolved therein and may also contain significant amounts of water-soluble materials such as the lower monofunctional and polyfunctional alcohols, amines, aldehydes, ketones, esters, amides, carboxylic acids, acetals, hemiacetals, ketals, hemiketals, cyclic ethers, and the like.

The dispersed phase can contain one or more inert and/or active substances dissolved therein. Any of a large number of biologically active materials inclusive of oil-soluble vitamins, pharmaceuticals, veterinarials, animal and plant pesticides, and so forth, and numerous other kinds of materials having relatively little solubility in water can be dissolved in the dispersed phase. The disperse phase can consist of an edible oil such as cottonseed, soybean, corn, olive, castor, sesame, peanut, menhaden, etc., oil. When the reconstituted emulsions are not intended for human or animal use, inedible oils and oil-like materials, e.g., mineral oil, kerosene, petroleum distillate, chlorinated hydrocarbons and other hydrocarbon derivatives, and essential oils can be used. In all cases, the inert and/or active substances will be dissolved in the oil/oil-like component prior to emulsification.

The invention is especially useful for incorporating oil-soluble, water insoluble drugs into gels to provide drug emulsions with superior drug absorption. Examples of such drugs include topical drugs such as benzoyl peroxide, salicylic acid, tretinoin, oxybenzone, monobenzone and trioxsalen; gastro-intestinal drugs such as castor oil and diphenidol; cardiovascular drugs such as some cardiac glycosides, clofibrate and probucol; adrenal hormones such as betamethasone and its acetate, cortisone, its acetate and cypionate, dexamethasone, prednisolone, methylprednisolone and their acetates; hypoglycemic drugs such as tolazamide and tolbutamide; sex hormones such as estradiol, estrone, ethinyl estradiol, benzestrol, diethylstilbesterol, norethindrone acetate, norgestrel and oxymetholone; the vitamins A, D, E, K and their esters and menadione; local anesthetics such as dibucaine and lidocaine; sedatives/hypnotics such as some of the barbiturates, disulfiram and glutethimide; antiepileptics such as carbamazepine, mephenytoin, phensuximide; psychopharmacologic agents such as chlorprothixene, haloperidol, perphenazine, piperacetazine, thiothixene and isocarboxazid; analgesic, antipyretic and anti-inflammatory agents such as pentazocine, ibuprofen, indomethacin, methotrimeprazine oxyphenbutazone, phenacetin and phenylbutazone; antineoplastic drugs such as busulfan, lomustine and mitotane; antimicrobial drugs such as sulfisoxazole acetyl, erythromycin estolate and stearate and pyrimethamine; parasiticides such as hexylresorcinol; miscellaneous drugs such as spirohydantoin mustard, 1-(2-chloroethyl)-3-(4-methylcyclohexyl)-1-nitrosourea, carbamic acid (1-methylethyl)-[5-(3,4-dichlorophenyl)2,3-dihydro-1 H-pyrrolizine-6,7-diyl]bis(methylene) ester, indoxole, and the like.

Classes of oil-soluble agricultural and household pesticides which are well suited for incorporation into the gels of this invention to provide pesticide emulsions include organo-phosphates such as Parathion, Malathion, Diazinon, Dichlorvos, Guthion, Bidrin, Ronnel and Tepp; carbamates such as Physostigmine, Neostigmine, Isolan, Dimetan, Dimetilan, Pyrolan, Pyramat, Sevin, Zectran, Mesurol and Carbaryl; DDT and related chlorinated diphenyl methanes, ethanes, propanes and butanes; cyclodienes such as Chlordane, Heptachlor, Aldrin, Dieldrin, Thiodan, Telodrin, Camphene, Toxaphene; rotenoids such as Rotenone, Sumatrol, Toxicarol, Deguelin; pyrethroids such as piperonyl butoxide, Sesamin Allethrolone; organic fluorine compounds, especially fluoroacetamide derivatives; nicotinoids such as nicotine, Anabasine, Diparcol, Demethylcotinine, Nicotyrine; hexachlorocyclohexanes such as Lindane; chlorinated phenols and naphthols; and DNOC (4,6-dinitro-o-cresol) and related compounds, and the like.

A wide variety of emulsifying agents can be used for the preparation of emulsions which on centrifugation yield the gel concentrates of this invention. The major requirement is that if a single emulsifying agent is employed, it should be substantially insoluble in the dispersed oil phase but soluble in the continuous aqueous phase as least up to the level of its concentration therein.

Such emulsifiers include nonionic and ionic surface active agents. For single nonionic emulsifiers, the HLB (hydrophile-lipophile balance) number should be in the range of about 8.0 to 18.0. Such nonionic emulsifiers include (but are not limited to) polyoxyethylated alkylphenols (e.g., octylphenol and nonylphenol), polyoxyethylated sorbitan monoesters, polyoxyethylated fatty or aryl-alkyl alcohols and fatty acids (the latter including esters of polyethylene glycol). Also suitable are anionic emulsifying agents such as alkyl, alkyl-aryl and aryl sulfonates, sulfates and phosphates, soaps (i.e., salts of carboxylic acids with at least 8 carbon atoms). Also included are cationic emulsifiers such as quaternary ammonium salts and salts of primary, secondary and tertiary amines containing at least one hydrocarbon moiety with 8 or more carbon atoms, and ampholytic emulsifiers in their zwitterionic or monoionic forms, and the like.

Some of the more common types of useful emulsifying agents are described in, among other publications, Rosen, *Surfactants and Interfacial Phenomena*, pp. 5–25, John Wiley & Sons (1978), the contents of which are incorporated by reference herein.

Combinations of two or more water-soluble, oil-insoluble, emulsifying agents can also be employed in preparing emulsions which on subsequent centrifugation provide the gels herein. Also suitable are combinations of one or more water-soluble emulsifiers with one or more oil-soluble emulsifiers. For instance, pairs of nonionic emulsifiers, one with a high HLB that is water-soluble and insoluble in oil, the other with a low HLB that is insoluble in the aqueous phase but soluble in the oil phase, can be used to form appropriate emulsions. For the most stable emulsions of a given oil in water, the combined HLB of such pairs of emulsifiers should match the HLB required to emulsify the oil in water within ±1.5 units.

Provided the amount of emulsifying agent(s) incorporated in the continuous phase is at least sufficient to provide an emulsion, this component of the gel and precursor emulsion can be used in widely varying amounts, e.g., from about 0.1% to about 10.0%, and preferably from about 0.5% to about 6.0%, of the total weight of the continuous phase.

The volumetric ratio of the dispersed phase to the continuous phase in the precursor emulsion can vary over wide limits, e.g., from about 20:1 to about 1:20, preferably from about 5:1 to about 1:5 and in the gel from about 10:1 to about 5,000:1, preferably from about 80:1 to about 1,000:1. The average size of the droplets constituting the continuous phase in the precursor emulsion is generally on the order of about 20 μm or below, an average particle size of about 10 μm or less typically providing good results. Following formation of the gel in accordance with the present invention and its reconstitution into a fluid emulsion, it has been observed that the average particle size of the droplets of dispersed component in the reconstituted emulsion will generally not exceed that of the dispersed component of the precursor emulsion by more than about 20 to 30%.

The precursor emulsion can be formed in a known and conventional manner employing commercially available equipment. Thus, for example, the oleophilic, hydrophobic component can be combined with the aqueous phase containing emulsifying agent in a mixer equipped with counter-rotating propellers at moderate speed to provide a coarse emulsion which is then further comminuted by passage one or more times through a homogenizer. Where a combination of a water-soluble and oil-soluble emulsifying agent is employed, the oil-soluble emulsifier can be dissolved in the oil phase or dispersed in the aqueous phase.

Ideally, centrifuging the emulsion will result in only two phases, namely, a gel phase containing substantially all of the oleophilic, hydrophobic component and usually a very small amount of the continuous aqueous phase; and a clear aqueous phase.

The conditions for carrying out centrifugation will be selected so as to provide, for a particular emulsion formulation, the aforesaid two phases. Excessive centrifugation is to be avoided as it will only cause a portion of the dispersed oleophilic, hydrophobic component to coalesce into a clear, supernatant layer which is fluid and useless as far as gel formation is concerned. Insufficient centrifugation is also to be avoided as this may leave some of the dispersed oleophilic, hydrophobic component in a cream layer located between the gel phase and the clear aqueous phase.

While it may sometimes be difficult in practice to carry out the centrifuging step under conditions which will avoid both the formation of a supernatant coalesced oil phase above the gel and a cream layer below the gel, one or the other of these conditions can usually be avoided by routine trial-and-error testing carried out on a small scale basis.

The temperature at which centrifugation is carried out is not critical. Thus, temperatures which are below, at or above ambient temperature are practical. However, it is generally preferred to conduct centrifugation at, and even more preferably, below ambient temperature since higher temperatures tend to retard gel formation.

It has been observed that during centrifugation, an opaque creamed layer will first form which will change shortly thereafter into the desired gel phase. Excessive centrifugation causes the separation of a coalesced, clear oil layer above the gel layer as previously noted. There does not appear to be either an upper limit to the number of rpm's or G's (multiples of the acceleration of gravity) required for gel formation (the practical limit being set by the capabilities of commercially available equipment) or a lower limit to this parameter. Even speeds as low as 100 rpm (or 100 G's) may be sufficient to form a gel provided the centrifugation is conducted for a sufficient period of time. In general, centrifugal speeds of from about 100 to about 200,000 rpm and even higher can be employed with speeds of from about 500 to about 100,000 rpm being preferred and speeds of from about 5,000 to about 50,000 rpm being especially preferred. This corresponds to about 2,000 to 75,000 G's. The duration of centrifugation can vary widely, e.g., from about 30 seconds to about 8 hours or more depending on the centrifugal force applied to the emulsion. Centrifugation for a period of from about 10 minutes to about 2 hours at speeds of from about 2,000 to about 50,000 rpm generally provide good results for most emulsion formulations.

The gel phase can be removed from the other phases employing simple procedures and placed in rigid containers or flexible packages such as collapsible ointment tubes for storage until needed. Addition of water, with or without electrolyte, and/or a water-soluble material such as any of those previously mentioned, to the gel will result in reformation of the emulsion.

The following examples are illustrative of gels in accordance with this invention and their method of preparation:

EXAMPLE I

A. Preparation of the Precursor Emulsion

Preliminary coarse emulsions containing 50%. hexadecane as the substantially oleophilic, hydrophobic component and water as the substantially hydrophilic, oleophobic component were prepared in 100 g quantities as illustrated for the following hexadecane emulsion prepared with 0.10% octoxynol: 1.40 g of 5% aqueous octoxynol solution, 65.29 g water and 33.31 g hexadecane were added in this order to a tall-form 200 ml beaker. Percentages are based on the weight of water present. The octoxynol solution was at least 2 days old to ensure full hydration. The mixture was stirred for 20 minutes at 30 volts input with a mixer equipped with two counter-rotating propellers (Brookfield Engineering Laboratories, Stoughton, Mass.). These stirring conditions were selected because higher speeds and/or longer agitation were found to cause foaming while lower speeds were found to produce coarser droplets. The emulsion was further comminuted by being passed three times through a stainless steel hand-operated emulsion homogenizer (Arthur H. Thomas Co., Philadelphia, Pa.) while applying maximum tension to the spring. The second and third pass through the homogenizer did not substantially reduce the mean droplet size of the emulsion but improved its reproducibility.

The finished emulsion was prepared by mixing weighed amounts of a 5% by weight aqueous octoxynol solution, water, aqueous electrolyte solution, and homogenized emulsion to provide the desired composition. The surfactant concentration was the same, for example, 0.10% by weight, in the preliminary and the finished emulsion. The oil content was 25% by weight for most finished hexadecane emulsions, most of which contained 0.10 or 0.20% by weight octoxynol. A "reverse addition" procedure was used for the hexadecane emulsions as follows: 5% aqueous octoxynol solution, water and aqueous electrolyte solution to provide a solution containing 0.10% octoxynol and an electrolyte. This solution was stored at room temperature for at least two days prior to the addition of hexadecane and emulsification. The preliminary coarse emulsion was made in 100 g quantities containing 25% by weight hexadecane by stirring for 20 minutes at 30 volt input with the counterrotating mixer. Emulsification was completed by three passes through the hand-operated homogenizer.

B. Preparation of the Gel

The hexadecane emulsions were subjected to centrifugation at 25° C. and 10,000 rpm (equivalent to 7,800 G's) for 65 minutes employing a thermostated centrifuge (Beckman Model J-21 preparative centrifuge, equipped with a fixed-angle rotor Type JA-20). The glass tubes used had a capacity of 12 ml, an inside diameter of 12.5 mm and were filled with an amount of emulsion containing 1.80 g hexadecane which ranged from 9 to 11 g. Centrifugation separated the emulsions into four phases, or layers, which were, from top to bottom, a supernatant layer of clear, coalesced hexadecane a few millimeters thick, a clear gel layer made up of discrete, uncoalesced droplets of hexadecane having a thickness of up to 18 mm, a white, opaque viscous layer of creamed emulsion a few mm thick and a clear aqueous layer.

The driving force that promotes creaming of the emulsion during centrifugation and compression of the disperse oil droplets from the creamed layer into a clear gel phase appears to be directly proportional to the difference in density between the continuous aqueous phase and the dispersed oil droplets. Hence, if the density of the aqueous phase is increased by dissolving high concentrations of salts, acids or bases in it, the formation of gel during centrifugation requires shorter centrifugation times and/or lower centrifugal speeds (rpm or G's).

C. Properties of the Gels

If a centrifuge tube containing the four phases was stoppered and stored in a vertical position at room temperature, the gel was left in contact with the aqueous phase. In that case, it reverted gradually and almost completely to a white, opaque cream layer within 15 hours of less. The transparent gel gradually turned white and opaque from the bottom upwards as the aqueous continuous phase diffused back into it, separating the dispersed oil droplets farther apart from one another. Gentle shaking or inversion of the tube then dispersed this cream layer throughout the aqueous phase, regenerating an emulsion similar to the original emulsion before centrifugation.

If the transparent gel was separated from the aqueous phase following the centrifugation and stored at room temperature, it was stable for several months except for the separation of traces of clear hexadecane. When portions of this gel were immersed in water, they gradually disintegrated into fluid, homogeneous emulsions on standing. Gentle agitation accelerated the dispersal of the gel throughout the aqueous phase.

The presence of additives dissolved in the aqueous phase had no adverse effect on the transformation of the gel into an emulsion. Such additives even accelerated the penetration of water into the gel and its conversion into an emulsion spreading throughout the entire aqueous phase.

The additives that were present in the aqueous phases in which gels were dispersed to reconstitute the emulsions include the following: 0.005, 0.10, 0.20 and 0.40 m (molal) $Na_2SO_4$; 0.010, 0.50, 1.50, 1.75, 2.20 and 2.95 m NaCl; 0.001, 0.01, 0.10, 1.0, 2.0, 3.0 and 5.0 m $H_2SO_4$; 0.002, 0.01, 1.0, 2.0, 3.0, 4.0 and 6.0 m HCl; 0.05, 0.10, 1.5, 2.0 and 3.0 m $Mg(NO_3)_2$; 0.50 and 1.4 m $Al(NO_3)_3$; 0.01, 0.50, 1.5 and 3.0 m NaSCN.

When portions of gel were immersed in such aqueous solutions, they slowly disintegrated to fluid emulsions. The hexadecane droplets preserved their identity and remained intact in these gels as shown by the following:

Gels were prepared by centrifuging standard hexadecane emulsions containing 0.20% octoxynol and either no electrolyte or 2.00 m HCl or 0.40 m $Na_2SO_4$. When these gels were redispersed in aqueous media of the same composition as those of the original emulsions, the mean volume-surface diameters of the reconstituted emulsions were $3.66\mu$ for the blank, $3.38\mu$ in 2.00 m HCl and $4.75\mu$ in 0.40 m $Na_2SO_4$. These diameters are only 23%, 5% and 49% larger, respectively, than the mean volume-surface diameter values of the original emulsions.

The gels were transparent and isotropic; they showed no birefringence when examined between crossed polarizer and analyzer. The individual oil droplets could not be distinguished under the microscope. These facts indicate that the thickness of the aqueous lamellas separating the distorted hexadecane droplets in the gels was considerably smaller than the wavelength of light. Thus, light passing through the clear gels underwent little or no refraction.

The chief driving force for the penetration of water or of aqueous solutions of octoxynol and electrolytes into the gel plugs, transforming them back into cream layers and eventually redispersing them into dilute emulsions, may be due to the osmotic or enthalpic component responsible for the steric stabilization of emulsions. Centrifugation of the cream layers squeezed the aqueous lamellas between distorted, polyhedral oil droplets down to a thickness of a few nanometers, causing compression or interpenetration of the polyoxyethylene moieties of the octoxynol molecules adsorbed on adjacent droplets. The aqueous lamellas thus contained a high concentration of polyoxyethylene chains, i.e., they were hypertonic compared to the bulk aqueous phase. Elastic retractive forces tending to expand the compressed polyoxyethylene chains and interfacial tension tending to restore the spherical droplet shape probably contributed somewhat to the penetration of aqueous media into the gels.

In connection with the osmotic effect, gels made from emulsions containing 0.20% octoxynol and 2.00 m HCl were somewhat more stable than gels formed from emulsions containing octoxynol only, whereas gels from emulsions containing 0.20% octoxynol and 0.40 m $Na_2SO_4$ were less stable, separating some hexadecane on standing. The former gels had probably somewhat thicker lamellas than gels prepared from emulsions without electrolytes owing to the presence of hydrochloric acid molecules bound to the ether groups of octoxynol in the form of an oxonium compound. The latter gels probably had thinner aqueous lamellas owing to the salting-out effect of sodium sulfate.

EXAMPLE II

Additional gels were formed in accordance with this invention employing the following oils, emulsifying agents and centrifugation conditions:

Oils hexadecane (cetane)
light mineral oil
heavy mineral oil
olive oil

Emulsifying Agents

Octoxynol 9 (Triton X-100), water-soluble, HLB=13.5 at concentrations of 0.1, 0.3, 3, 6 and 10%.

Combination of Triton X-15 (oil-soluble, HLB=3.6)+Triton X-102 (water-soluble, HLB=14.6) in the proportion to yield an HLB of 11; concentration: 3%.

Polysorbate 80 (Tween 80), water-soluble, HLB=15 at concentrations of 0.1 and 0.3%.

Combination of polysorbate 80+sorbitan monooleate (Span 80, oil-soluble, HLB=4.3) in the proportion to yield an HLB of 10, at concentrations of 1.5, 3 and 6%.

Sodium lauryl sulfate (sodium dodecyl sulfate) at a concentration of 0.3%.

In general, emulsions based on a single emulsifying agent of intermediate HLB produced more gel on centrifugation than emulsions based on pairs of emulsifying agent, one with a low HLB and oil-soluble and the other with a high HLB and water-soluble. For the Tween 80-Span 80 combination with an HLB of 11, the 1.5% level produced considerable amounts of gel while only small amounts were obtained at the 3.0 and 6.0% levels.

All of the emulsifiers tested provided gels, with octoxynol 9 apparently providing the largest amounts and the most stable gels (optimum level of 6%).

Centrifugal Speeds—Time of Centrifugation 7,800 G's for 15, 30, 60 and 120 minutes
32,600 G's for 15, 30 and 60 minutes The higher speed did not increase the amount of gel. Longer centrifugation times did, but also increased the amount of coalesced oil somewhat.

What is claimed is:

1. A method for preparing a transparent gel which comprises centrifuging an emulsion comprising a substantially oleophilic, hydrophobic liquid component constituting the dispersed phase in a substantially aqueous medium containing an emulsifying amount of emulsifying agent which is soluble therein at its level of concentration but which is substantially insoluble in the oleophilic, hydrophobic component, the emulsion being devoid of gelling agent, to separate the emulsion into a transparent gel phase containing substantially all of the oleophobic component of the emulsion and a clear aqueous phase, said oleophilic, hydrophobic liquid component being a liquid organic material having at most low or slight solubility in water and/or other polar solvent and said organic material being an edible fat, edible oil, liquid paraffin, aliphatic hydrocarbon or derivative thereof, aromatic hydrocarbon or derivative thereof, essential oil, or mixtures thereof and said emulsifying agent being a nonionic surface active agent having an HLB number of from about 8 to about 18 or an ionic surface active agent.

2. The method of claim 1 wherein the emulsifying agent is a nonionic polyoxyethylated alkylphenol, polyoxyethylated sorbitan monoester or polyoxyethylated fatty or aryl-alkyl alcohol or fatty acid.

3. The method of claim 1 wherein the ionic emulsifying agent is an anionic alkyl, alkyl-aryl or aryl sufonate, sulfate, phosphate or soap.

4. The method of claim 1 wherein the ionic emulsifying agent is a cationic quaternary ammonium salt or salt of a primary, secondary or tertiary amine containing at least one hydrocarbon moiety of at least 8 carbon atoms.

5. The method of claim 1 wherein the ionic emulsifying agent is an ampholytic surface active agent in its zwitterionic or monoionic form.

6. The method of claim 1 containing at least two water-soluble nonionic and/or ionic emulsifying agents.

7. The method of claim 1 containing at least one water-soluble nonionic or ionic emulsifying agent and at least one oil-soluble nonionic or ionic emulsifying agent.

8. The method of claim 1 wherein the oleophilic, hydrophobic component is a bioeffective substance alone or dissolved in an oil.

9. The method of claim 8 wherein the bioeffective substance is a pharmaceutical or veterinarial alone or dissolved in an edible fat or oil or in an inedible, water-immiscible liquid.

10. The method of claim 1 wherein in the gel phase, the volumetric ratio of dispersed phase to continuous phase is from about 10:1 to about 5,000:1.

11. The method of claim 10 wherein in the gel phase, the volumetric ratio of dispersed phase to continuous phase is from about 80:1 to about 1,000:1.

12. The method of claim 1 wherein the emulsion is centrifuged at from about 100 to about 200,000 rpm or higher below, at or above ambient temperature.

13. The method of claim 1 wherein the emulsion is centrifuged at from about 5,000 to about 50,000 rpm at, below or above ambient temperature.

14. The method of claim 1 wherein the emulsion is centrifuged at from about 2,000 G's to about 75,000 G's at, below or above ambient temperature.

15. A transparent gel prepared by the method of claim 1.

16. A method for preparing an emulsion which comprises adding an emulsion-reconstituting amount of water to a gel of claim 15 with or without gentle stirring to hasten reconstitution of the emulsion.

17. The method of claim 16 wherein the water contains one or more water-soluble inorganic and/or organic materials dissolved therein up to the limit of their solubility in said water.

18. The method of claim 17 wherein the water-soluble material is an electrolyte, salt acid, base, sugar, buffering agent or polar solvent.

19. The method of claim 16 wherein one or more water-soluble inorganic and/or organic materials is added to the emulsion.

20. The method of claim 19 wherein the water-soluble material is an electrolyte, salt, acid, base, sugar, buffering agent or polar solvent.

21. The emulsion resulting from the process of claim 16.

22. The emulsion resulting from the process of claim 17.

23. The emulsion resulting from the process of claim 18.

24. The emulsion resulting from the process of claim 19.

25. The emulsion resulting from the process of claim 20.

26. A transparent gel prepared by the method of claim 2.

27. A transparent gel prepared by the method of claim 3.

28. A transparent gel prepared by the method of claim 8.

29. A transparent gel prepared by the method of claim 9.

30. A transparent gel prepared by the method of claim 11.

31. A transparent gel prepared by the method of claim 12.

32. A transparent gel prepared by the method of claim 14.

* * * * *